(No Model.) 2 Sheets—Sheet 2.

O. RICHARDS.
HORSE HAY RAKE.

No. 521,271. Patented June 12, 1894.

Witnesses
Jas. K. McCathran
O. B. Owens

Inventor
Orlando Richards
By his Attorneys,
C. A. Snow & Co.

THE NATIONAL LITHOGRAPHING COMPANY,
WASHINGTON, D. C.

UNITED STATES PATENT OFFICE.

ORLANDO RICHARDS, OF BRISTOL, WISCONSIN.

HORSE HAY-RAKE.

SPECIFICATION forming part of Letters Patent No. 521,271, dated June 12, 1894.

Application filed February 10, 1894. Serial No. 499,790. (No model.)

*To all whom it may concern:*

Be it known that I, ORLANDO RICHARDS, a citizen of the United States, residing at Bristol, in the county of Kenosha and State of Wisconsin, have invented a new and useful Horse Hay-Rake, of which the following is a specification.

My invention relates to that class of horse hay-rakes which are constructed to deliver the hay continually in a windrow at one side of the rake; and the object of the invention is to provide superior means for assisting the delivery of the hay.

To this end my invention consists of certain improved features of construction and combination and arrangement of parts which will now be more fully described hereinafter and finally embodied in the claim.

Figure 1:
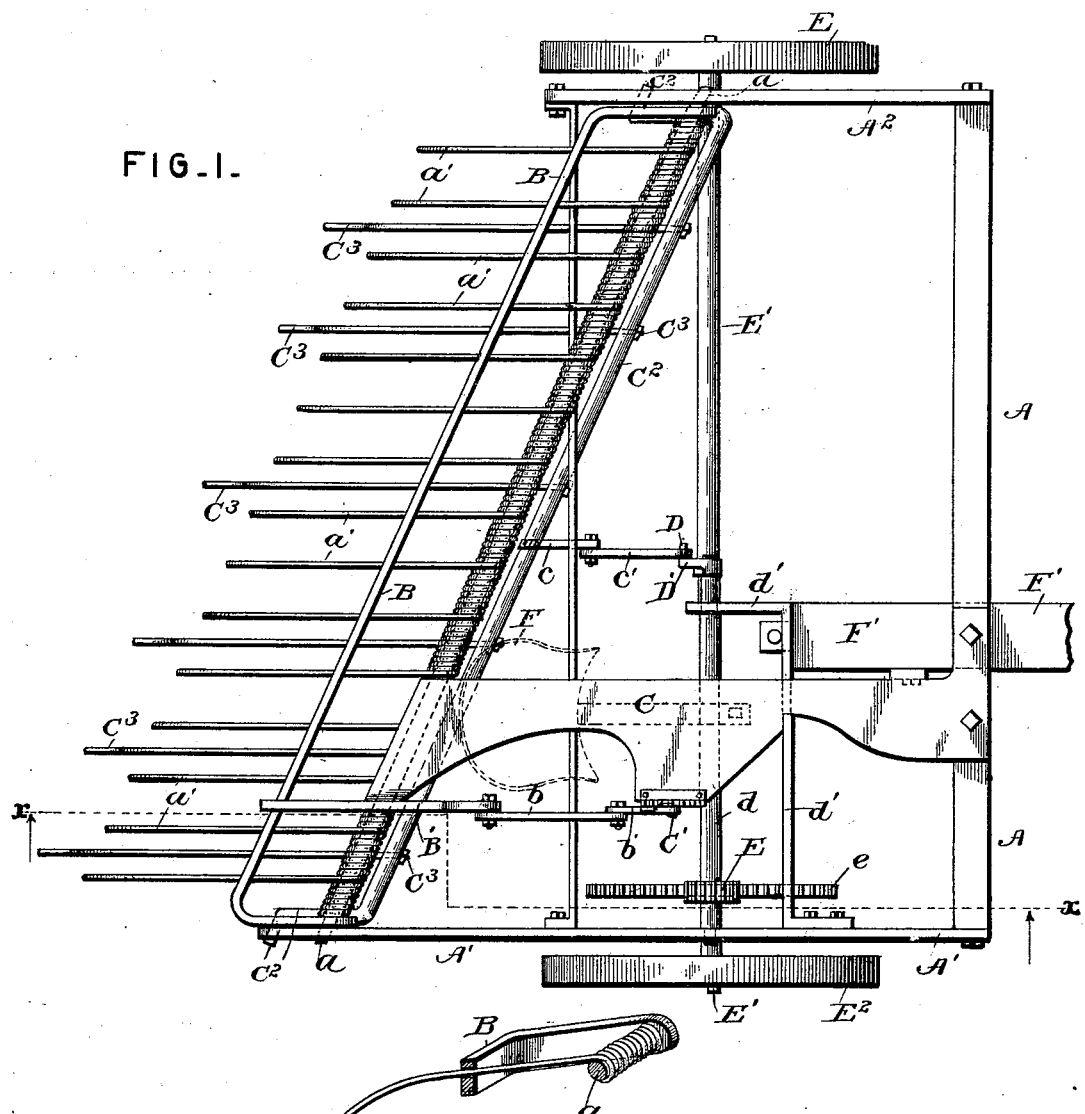
Figure 2:
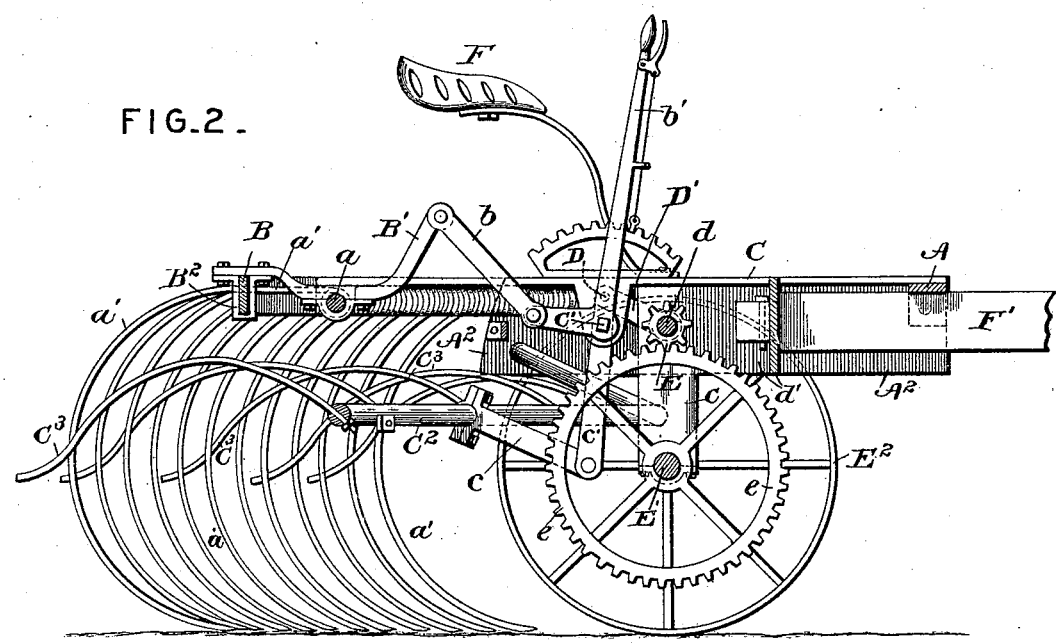
Figure 3:
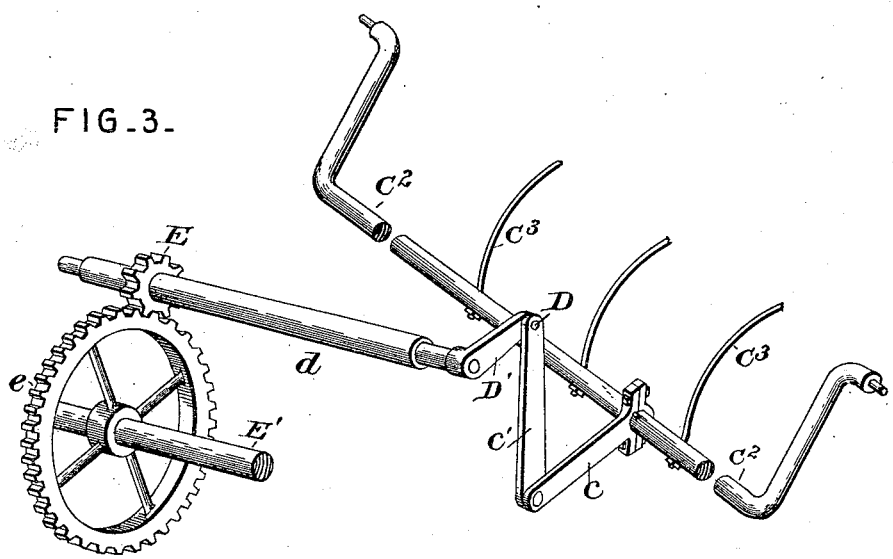

Referring to the accompanying drawings—Figure 1 is a plan view of a machine constructed after the manner of my invention; Fig. 2 a sectional view taken on the line $x$—$x$ Fig. 1; and Fig. 3 a perspective view of the picker mechanism detached from the machine. Fig. 4 is a detail perspective of one of the rake teeth.

The frame of my machine consists of the metallic front bar A, and the side bars A' and A² which latter are secured to the front bar A by any suitable means. A cross brace A³ is provided and extended from one of the side bars to the other. The bar A' is longer than the bar A², and the two bars have journaled near their rear ends the shaft, or rod $a$, to which the rake teeth $a'$ are attached. Secured to the shaft $a$ at its ends is the bar B, which extends rearwardly from each end and then curves and extends parallel with the shaft $a$. Through this bar the rake teeth $a'$ pass and this serves to hold them in proper alignment, and to assist in raising the teeth from engagement with the ground.

Pivoted to the shaft $a$ is the lever B' which extends rearwardly until the bar B is reached, whereat it is attached to the bar by means of an eye B². The forward end of the lever is connected to the link $b$, which is in turn connected to the short arm of the hand lever $b'$, and this lever is pivoted to the trunnion C', of the section C, of the frame. The forward arm of the lever B' is curved or bent upwardly so that upon operating the lever $b'$ the bar B, and consequently the rake teeth $a'$, will be raised or lowered.

Journaled in the extreme rear ends of the bars A' and A² is the crank-bar C², which is bent at each end and which extends parallel with the shaft $a$. To the main part of this bar the picker fingers C³ are attached, and these curve upwardly and thence downwardly, and project out to a point just in rear of the rake-teeth. Rigidly secured to the bar C², at or about its middle, is a forwardly extending arm $c$, to which the link $c'$ is pivotally connected. This link, $c'$, extends upwardly and is pivotally connected to the wrist-pin D of the crank-arm D', and the crank D' is, in turn, fixed to the shaft $d$, outside its bearing.

Shaft $d$, is journaled in the section A' of the frame and in the counter-frame $d'$, and has keyed thereon near the bar A' the pinion wheel E.

E' represents the axle of the rake, which is revolubly mounted in the frame-bars or sections A' and A², and which is keyed to the carrying wheels E². The axle E' revolves with the wheels E², and has fixed to it the spur-gear wheel $e$. This gear, $e$, meshes with the pinion E of shaft $d$, and by this means the shaft $d$, is revolved.

The revolution of the shaft $d$, is followed by the swinging of the bar C², as shown in Fig. 2, and a consequent and similar movement of the picker-fingers C³.

F indicates a seat, which is fixed to the part C of the frame. This seat may be of any construction.

F' indicates the tongue by which the machine is drawn, and this is secured to the counter-frame $d'$ and to the front bar A, and projects out from the machine front.

In operation the rake is driven along the field, and its teeth $a'$ operate to accumulate the hay. As the axle revolves the movement is transmitted to the shaft $d$, and thence to the picker-fingers C³. These fingers move in the quadrant of a circle, and as the hay in the teeth increases in bulk, the fingers C' strike against it and push it down. This keeps the hay agitated and causes it to be delivered out the rear or delivery end of the rake. It will be seen that by the construction which I employ, the hay will be delivered with the highest degree of regularity, and that it is not allowed to clog the rake-teeth or other parts of the machine.

Having described my invention, what I claim is—

In a horse hay rake, the combination of raking teeth adapted to gather the hay, a shaft revolubly mounted parallel with the axle of the rake and geared so as to revolve in unison therewith, a shaft having a main portion extending parallel with the line of rake teeth and having each of its ends bent rearwardly and provided with trunnions extending parallel with the longitudinal disposition of the main portion of the shaft, said trunnions being rockably mounted in the frame of the machine, an arm rigidly secured to the main portion of the shaft and extending in a line parallel with the longitudinal line of the bent ends thereof, a crank-arm connected to the revolving shaft and to the arm on the bent shaft whereby, as the revolving shaft operates, an oscillatory movement will be imparted to the main portion of the bent shaft, said shaft swinging on its trunnions, and finger-bars secured to the main portion of the bent shaft and extending rearwardly therefrom through the space embraced by the rake teeth, said bars being adapted to strike through the said space and to act upon the hay therein, substantially as described.

In testimony that I claim the foregoing as my own I have hereto affixed my signature in the presence of two witnesses.

ORLANDO RICHARDS.

Witnesses:
EUG. O'DONNELL,
HENRY J. VANCE.